Patented Dec. 26, 1950

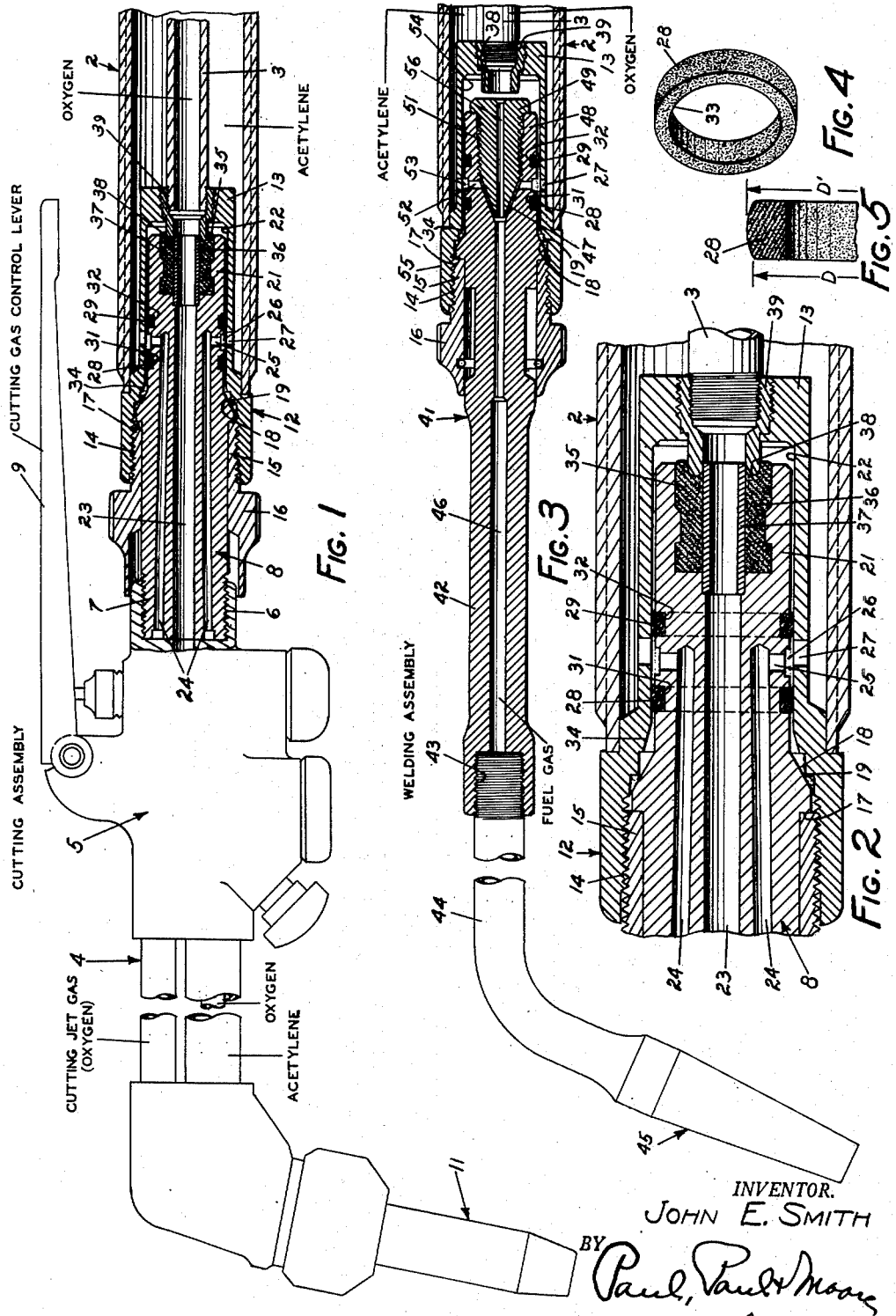

2,535,873

UNITED STATES PATENT OFFICE 2,535,873

OXYGEN-ACETYLENE TORCH

John E. Smith, Minneapolis, Minn., assignor to Smith Welding Equipment Corporation, Minneapolis, Minn., a corporation of Minnesota Application October 27, 1948, Serial No. 56,708

7 Claims. (Cl. 158—27.4)

This invention relates to new and useful improvements in oxygen-acetylene torches of the general type disclosed in the patent to Elmer H. Smith, No. 2,231,199, granted February 11, 1941.

Cutting torches and welding torches as now commonly constructed, usually have their tips secured in fixed position in the torch handles, whereby it is frequently necessary to rotate the torch handle in order that the flame may be accurately directed onto the work, particularly if the work is overhead. To simplify the manipulation of a torch, it is highly desirable that the tip be so mounted in the torch handle that it may be conveniently rotatively adjusted therein at any time, during the operation of the torch, to facilitate directing the flame of the tip against the work, and whereby the position of the torch handle in the operator's hand need not be changed. In the operation of a cutting or welding torch, it is frequently necessary to direct the flame in an upward or lateral direction, and to do this with a conventional torch may require frequent turning of the torch handle in order to hold the tip flame on the work. When the handle is thus relatively rotated, the fuel and cutting gas valves may be inconveniently positioned for the operator which may interfere with the manipulation of said valves and thus tend to retard the welding operation.

The present invention is particularly directed to a cutting or welding torch provided with means whereby the tip of the torch may readily be rotatably adjusted in the torch handle, any time during the operation of the torch, as disclosed in the hereinbefore mentioned patent and without requiring the use of separable tools for manipulating the usual clamping nut of the torch tip.

An important object of the present invention, therefore, is to provide an oxygen-acetylene torch comprising a handle having a head secured in one end thereof for detachably receiving a torch tip, and a novel sealing means being provided between the usual tip supporting member and said head for preventing leakage of combustible gases from the torch head, when the torch is in use, and whereby the torch tip may be conveniently rotatively adjusted in the torch head at will during operation of the torch.

A further object is to provide in combination with a torch tip and supporting handle, a plurality of compressible sealing elements between which the fuel gas is directed from the torch handle into the usual preheating passages or ducts in the torch tip, said sealing elements permitting the tip supporting member to be longitudinally moved into its supporting bore in the torch head, in the operation of inserting the tip into the torch head or removing it therefrom, and whereby the usual clamping nut is received in threaded engagement with the torch head and may readily be manipulated without the use of a wrench, as is now common practice.

A further object of the invention is to provide a novel sealing means comprising a plurality of annular compressible sealing elements or rings of a suitable resilient material such as rubber, said sealing elements being mounted in suitable annular grooves provided in the periphery of the tip supporting member, and the root diameter of said grooves being slightly larger than the normal inside diameter of said compressible sealing elements or rings, whereby when the sealing elements are fitted onto said grooves they will seat snugly in the bottoms thereof with their peripheries projecting slightly above the periphery of the tip supporting member, and the usual diameter of the tip supporting member, being slightly less than the diameter of the bore provided in the torch head for receiving said tip member, whereby the tip supporting member may readily be inserted into said bore with the periphery of the sealing elements snugly engaging the wall of the enlarged bore in the torch head, thereby causing said sealing elements to become compressed between said bore and the bottoms of said grooves, to thereby prevent any possible danger of leakage of the fuel gases around said sealing elements, it being understood that said sealing elements are disposed in axially spaced relation, and are located one at each side of the usual ducts for conducting the fuel gas from the interior of the torch handle into the preheating gas passages provided in the tip supporting member.

A further object is to provide a novel sealing means for preventing leakage of the fuel and cutting gases from a cutting torch and by the use of which the tip may be rotatively supported within the torch head to permit convenient rotary adjustment thereof at any time during the operation of the torch, said sealing means including a pair of annular compressible sealing elements or rings mounted in axially spaced relation upon the usual tip member of the torch tip, and a tubular flexible sealing element being provided at the end of the tip member and having a cutting gas passage therein communicating at one end with the cutting gas passage in the tip supporting member, and having its other end in communication with the usual cutting gas supply conduit located within the torch handle, said tubular sealing element being seated within a bore in the tip supporting member and having its exposed end adapted to engage an annular seat provided at the bottom of the usual enlarged bore of the torch head, whereby when the tip supporting member is secured in adjusted position within the torch head, the connection between the tip supporting member and the cutting gas supply conduit is positively sealed against leakage to prevent the cutting gas or oxygen within the torch from intermixing with the fuel gases in the torch head, and at the same time the fuel gas connection between the interior of the torch handle and the preheating fuel gas passages in the tip are sealed against leakage by the axially spaced annular sealing elements or rings.

Other objects of the invention reside in the provision of a novel sealing means for preventing leakage of the fuel gases from a torch head, which sealing means may be utilized with equal success in both cutting and welding torch assemblies; in the combination of such a sealing means and a tubular sealing element inserted in a bore provided in the end of the usual tip supporting member of the torch adapted to engage an annular seat in the bottom of the tip supporting bore of the torch head, thereby to prevent leakage of the cutting gas from the torch head, and said combined sealing elements cooperating to secure the tip in the torch head without leakage and without utilizing a metal-to-metal sealing means, as is customary in conventional torches, and which require manipulation of a clamping nut to secure the tip in the torch head or free it therefrom; and in the simple and inexpensive construction and arrangement of the various sealing elements, whereby they become, in effect, a component part of the supporting member and facilitate the removal of the tip from the torch head or its insertion therein, as will be understood.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a side view of a cutting torch assembly, partially broken away to illustrate the connection between the tip supporting member and the torch head;

Figure 2 is an enlarged fragmentary sectional view showing the back end of the tip supporting member positioned in the usual bore of the torch head, and also showing the novel sealing means for preventing leakage of the fuel gas from the torch head;

Figure 3 is a view similar to Figure 1, showing the invention applied to a welding torch assembly;

Figure 4 is a perspective view of one of the annular sealing elements or rings removed from the back end member of the torch tip; and Figure 5 is a cross-sectional view of one of the sealing rings, showing the preferred configuration of said rings.

In the selected embodiment of the invention herein disclosed, there is illustrated in Figure 1, for purposes of disclosure, a portion of a tubular torch handle 2, one end of which is in communication with a source of acetylene under pressure controlled by a suitable control valve, not shown. An oxygen supply conduit 3 is shown within the handle 2 and has one end in communication with a supply of oxygen, under pressure. A control valve, not shown is provided for controlling the flow of oxygen through the conduit 3. The control valves above referred to are well known in the art, and it is therefore deemed unnecessary to herein illustrate the same. It is also to be understood that the pressures of the acetylene and oxygen are automatically controlled by a suitable pressure regulator, not shown, also well known in the art.

The structure illustrated in Figure 1 shows what is commonly known in the trade as a cutting assembly, and is generally designated by the numeral 4. It comprises a butt member 5 having a threaded socket adapted to receive the threaded end portion 7 of a tip supporting member, generally designated by the numeral 8. The butt member 5 is shown provided with the usual cutting gas control lever 9, by manipulation of which the flow of cutting gas to the usual cutting gas passage of the tip 11 of the torch may be conveniently controlled.

The handle 2 of the torch is shown having a terminal member, generally designated by the numeral 12, secured in one end thereof. The member 12 is commonly referred to in the trade as the torch head, and has a cylindrical portion 13 extending inwardly into the adjacent end of the handle 2 with its periphery spaced slightly from the bore of the handle to provide an annular gas passage therearound. The portion of the torch head which projects from the handle 2 has a threaded socket 14 therein adapted to receive the threaded end portion 15 of a clamping nut 16, bored to fit over the projecting end portion of the tip supporting member 8, as clearly illustrated in the drawing.

The inner end of the end portion 15 of the clamping nut 16 is shown seated against an annular shoulder 17 provided on the tip supporting member 8, whereby the conical face 18 of the member 8 may, if necessary be forced into engagement with an annular seat 19 provided at the bottom of the threaded socket 14, thereby to provide an emergency seal for sealing the connection between the tip supporting member and the torch head.

Under normal operating conditions, the conical face 18 is retained in spaced relation from the seat 19, as shown in the drawings, and does not function as a sealing means. It is used only in the event that the compressible sealing elements, next to be described, should fail.

An important feature of the present invention resides in the compressible sealing means provided for preventing leakage of the fuel and cutting gases from the torch head, when the torch is in operation. As best illustrated in Figure 2, the tip supporting member 8 has a cylindrical end portion 21 adapted to be received in an enlarged bore 22 provided in the inner end portion 13 of the torch head 12. The tip supporting member 8 is provided with the usual axially disposed cutting gas passage 23, which extends lengthwise through the member 8 and is in communication with the cutting gas supply conduit 3 at one end.

The tip supporting member 8 also has a plurality of acetylene gas passages 24 therein which extend inwardly through said member from the butt 5 of the torch to a point within the cylindrical bore 22 of the torch head, where said passages 24 communicate with a plurality of radial ports 25 which establish communication between the passages 24 and an annular groove 26 provided in the periphery of the cylindrical end portion 21 of the tip supporting member. Suitable ducts 27 are provided in the wall of the enlarged bore 22 of the torch head for establishing communication between the ports 25 and the annular space provided around the inner portion 13 of the torch head, as clearly illustrated in Figure 3.

In the construction as herein illustrated, the cylindrical end portion 21 of the tip supporting member 8 is shown of slightly smaller diameter than the bore 22, whereby a restricted annular space may be provided between the periphery of the end portion 21 of the tip supporting member and the wall of the bore 22.

To prevent leakage of the fuel gases into this space, a plurality of suitable compressible sealing elements 28 and 29 are mounted in suitable grooves 31 and 32, respectively, provided in the periphery of the cylindrical extension 21 of the tip supporting member 8. The bottom or root diameter of the grooves 31 and 32 is slightly larger than the interior diameter 33 of the sealing elements 28 and 29, whereby when the sealing elements are fitted into their respective grooves 31 and 32, they will be slightly expanded to thereby cause them to seat firmly into the bottoms of the grooves.

Such expansion of the sealing elements 28 and 29 will also increase their normal uncompressed exterior diameters to slightly more than the diameter of the bore 22 in the torch head 12, whereby when the cylindrical end portion 21 of the tip supporting member 28 is inserted into the bore 22, the sealing elements 28 and 29 will become firmly compressed in their respective grooves 31 and 32, when the sealing elements enter the bore 22, as will be understood by reference to Figure 2. To facilitate inserting the cylindrical end portion 21 into the bore 22, the wall of the open end of the bore 22 is slightly outwardly flared, as shown at 34, in Figure 3, thereby to guide the sealing elements into the bore, as will be understood.

The peripheries of the sealing elements 28 and 29 may also be slightly rounded in an axial direction, as indicated in the cross-sectional view of Figure 5. When thus constructed, the diameter D of the ends of each sealing ring, when said rings are mounted in their supporting grooves 31 and 32, prior to inserting the tip supporting member into the bore 22, will be substantially equal to the diameter of the said portion 21 of the member 8, whereas the maximum diameter D' of the center portion of each ring will be relatively greater than the diameter of the bore 22, as hereinbefore stated.

By thus shaping the peripheries of the sealing rings 28 and 29, when the tip supporting member is initially fitted into the bore 22, the corners of the sealing rings will not interfere with the walls of the bore 22 because of the diameter of the ring ends being substantially equal to the outside diameter of the member 21. However, because of the maximum diameter D' of each ring being relatively greater than the diameter of the bore 22, the rings are firmly compressed in their respective grooves 31 and 32 as hereinbefore stated, whereby portions of the rings will slightly flow or squeeze into the annular space between the periphery of the supporting member 8 and the wall of the bore 22, whereby the sealing action of said rings is greatly improved. It will also be noted by reference to Figure 2, that because of the sealing rings being thus compressed in their supporting grooves, the full length of their peripheries will bear against the wall of the bore 22, assuring maximum protection against leakage.

Thus, when the tip supporting member is fitted into the bore 22, it may readily be noted that the connection between the wall of the bore 22 and the periphery of the cylindrical end portion 21 of the tip supporting member will be sealed against leakage of the fuel gases so that the fuel gases cannot leak into the bottom of the bore 22 nor outwardly through the head 12 to the atmosphere. The sealing elements, when in position in the bore 22, are under a pre-set compression load which can neither be increased nor decreased by manipulation of the clamping nut 12. The clamping nut therefore need not be drawn up tightly with a wrench to secure the tip in the torch head, it being readily manipulated with a bare hand to secure the tip in the head. In the present construction, the clamping nut merely serves as a holding nut to prevent the tip supporting member 8 from being blown out of the torch head by the pressure of the gas within the torch handle and head. The clamping nut also serves to retain the ports and ducts 25 and 27 in registration with each other, as shown in Figure 2, to permit free flow of the fuel gas from the interior of the handle 2 to the acetylene passages 24.

If, for any reason, one or both of the sealing elements 28 or 29 should become defective and fail to maintain a leak-tight connection between the parts, then the clamping nut 16 may be manipulated to force the beveled face 18 of the tip supporting member into engagement with the annular seat or shoulder 19 of the torch head, to thereby prevent leakage of the fuel gases, in the event of such an emergency.

In actual operation, the compressible sealing rings 28 and 29, herein disclosed, have proven very successful. Because of the flexibility of the sealing elements and the manner in which they are supported within the torch head, excessive pressures exerted against the sealing rings will force them against the side walls of their supporting grooves 31 and 32 which will tend to expand the sealing rings and thus greatly improve their sealing action. It is impossible for the sealing elements or rings to become displaced from their supporting grooves, when the tip supporting member 8 is in operative position within the torch head.

Another feature of the invention resides in the provision of a tubular sealing element 35 supported in a bore 36 provided in the inner end of the cylindrical extension 21 of the tip supporting member 8. A suitable sleeve 37 is inserted in the bore of the tubular sealing element 35 to prevent contraction of said bore when pressure is exerted on the ends of the sealing element 35, and whereby the cutting gas passage 23 will always remain in open position through the sealing element 35.

An annular seat 38 is provided in the bottom of the bore 22 of the torch head adapted to engage the adjacent end of the tubular sealing element 35 and thereby positively seal the connection between the inner end of the cylindrical member 21 and the bottom of the bore 22, as will be understood by reference to Figure 2. The seat 38 may be provided at one end of a bushing 39 threaded exteriorly to facilitate securing it against relative movement within the inner end 13 of the torch head 12. The bushing 39 is also preferably interiorly threaded to receive the adjacent end of the cutting gas conduit 3.

The tubular sealing element 35 thus positively prevents leakage of the cutting gas into the restricted annular space between the exterior of the cylindrical end portion 21 of the tip supporting member and the wall of the bore 22, whereby all danger of the cutting and fuel gases intermixing within the torch head are positively eliminated.

In Figure 3 the invention is shown applied to a welding assembly wherein the tip supporting member, generally designated by the numeral 41, is shown provided with an extension 42 having a threaded socket 43 at its outer end adapted to receive one end of a conduit 44, forming a part of the usual welding tip 45. The tip supporting member 41 has a fuel gas passage 46 therein which is in communication with a frusto-conical gap 47 provided within the cylindrical end portion 48 of the member 41, to facilitate intermixing of the acetylene and oxygen gases to provide a highly combustible fuel gas, when delivered to the torch tip 45.

The frusto-conical gap 47 is formed by a nozzle 49 secured in threaded engagement with a socket 51 provided in the end of the cylindrical end portion 48 of the member 41. Ports 52, similar to the ports 25 of the cutting assembly, are provided in the wall of the cylindrical end portion 48 of the member 41 and register with suitable ducts 53, provided in the wall of the bore 54 of the torch head 55, in which the member 41 is supported.

In the welding assembly shown in Figure 3, similar annular sealing elements or rings 28 and 29 are utilized to seal the connection between the periphery of the cylindrical end portion 48 with the member 41 and the wall of the bore 54. The nozzle 49 has a passage 56 extending lengthwise therethrough and communicates at one end with the passage 46 in the member 41, and at its opposite end with the conduit 3 for supplying oxygen to the nozzle.

From the foregoing it will thus be seen by reference to Figures 1 and 2, that in the cutting assembly a plurality of seals are provided, the dual seal provided by the annular sealing elements or rings 28 and 29, and the seal provided by the tubular sealing element 35 at the inner end of the end portion 21 of the torch supporting member 8 for preventing leakage of the oxygen or cutting gas into the bore 22 where the member 21 connects with the conduit 3.

Also by utilizing the compressible sealing elements 28 and 29, the tip 11, including the butt 5 and the tip supporting member 8, may be relatively rotated with respect to the handle 2 to facilitate directing the flame of the torch against the work.

The rotative adjustment of the tip is also inherent in the welding assembly, shown in Figure 3, and may be found very useful in such a torch because the tip may then be rotated to any desired position most suitable for accomplishing a given job, and the torch handle may always be held in its normal position whereby the valves for controlling the flow of oxygen and acetylene to the tip may be manipulated in the conventional manner.

The incorporation of the compressible sealing elements 28 and 29 in the torch head and tip does not add materially to the cost of constructing the parts, as the sealing rings may be preformed to their required size, and the annular grooves 31 and 32 may readily be cut in the periphery of the cylindrical end portions 21 and 48 of the torch supporting members 8 and 41, respectively.

In the present instance, the sealing elements are shown supported in annular grooves provided in the periphery of the cylindrical end portion 21 of the tip supporting member. It is to be understood, however, that the sealing elements may be supported in grooves provided in the wall of the bore 22 of the torch head without departing from the scope of the invention.

It will be apparent to those skilled in the art that I have acomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. A torch comprising a handle having means at one end for connecting it to a supply of fuel gas and oxygen, a head secured in the opposite end of the handle and having a bore therein, open at one end, a duct for establishing communication between said bore and the supplies of fuel gas and oxygen, a torch tip supporting member having a cylindrical portion fitting in said bore with its periphery spaced from the wall of the bore, thereby to provide an annular space therebetween, a clamping nut received in threaded engagement with the head for securing the tip supporting member in said bore, and an annular compressible sealing element encircling the cylindrical portion of the tip supporting member and compressed within said annular space and disposed between said duct and the open end of the bore, thereby to prevent leakage of the fuel gases from the torch head.

2. A torch comprising a handle having means at one end for connecting it to a supply of fuel gas and oxygen under pressure, a head secured in the opposite end of the handle and having a cylindrical bore therein, a radial duct in the wall of said bore for establishing communication between the bore and the supplies of fuel gas and oxygen, a torch tip supporting member having a cylindrical portion loosely fitting in said bore substantially the length thereof, axially spaced annular grooves in the periphery for said cylindrical portion located at opposite sides of said radial duct, and a compressible sealing element received in each of said grooves, the normal uncompressed outside diameter of said sealing elements exceeding the diameter of said bore, whereby when the tip is inserted into the bore, said sealing elements are firmly compressed between the bottoms of said grooves and the wall of said cylindrical bore to thereby prevent leakage of the fuel gas from the torch head to the atmosphere.

3. A torch comprising a handle having means at one end for connecting it to a supply of fuel gas and oxygen under pressure, a head secured in the opposite end of the handle and having a cylindrical bore therein, a radial duct in the wall of said bore for establishing communication between the bore and the supplies of fuel gas and oxygen within the handle, a torch tip supporting member having a cylindrical portion loosely fitting in said bore, axially spaced grooves in the periphery of said cylindrical portion located at opposite sides of said radial duct, a readily compressible annular sealing element received in each of said grooves, said sealing elements normally having a convex periphery in an axial direction and being of such size that when the tip supporting member is inserted into said bore, said sealing elements are firmly compressed between the bottoms of the grooves and the wall of said bore, to thereby positively prevent leakage of the fuel gas from the torch head to the atmosphere, said sealing elements also permitting the tip supporting member and the torch tip to be relatively rotated in the handle to facilitate positioning the tip relative to the work.

4. A torch comprising a hollow handle having a head secured in one end thereof and provided with an enlarged bore terminating at its outer end in a threaded socket, means for admitting fuel gases into the handle, a torch tip comprising a supporting member having an elongated cylindrical portion fitting in said bore and having longitudinally extending fuel gas passages therein, the inner ends of which are in communication with said bore, axially spaced annular grooves in the periphery of said cylindrical end portion located at the opposite sides of the intakes of said fuel gas passages, ducts in the wall of said bore between said grooves for establishing communication between the interior of the handle and the intakes of said fuel gas passages, a readily compressible sealing element fitting in each of said grooves and readily compressed between the bottoms of the grooves and the wall of the bore, thereby to prevent leakage of the fuel gases from said bore, a nut received in threaded engagement with the threaded socket in the end of the torch head for detachably securing the tip supporting member in said bore, said sealing elements providing a leaktight connection between the wall of the bore and the periphery of the torch tip supporting member and permitting the tip supporting member to be relatively rotated within the torch head during operation of the torch and without interrupting the operation thereof.

5. A torch comprising a handle having a head secured in one end thereof and provided with an enlarged bore, means for admitting a fuel gas into the handle, a torch tip supporting member comprising an elongated cylindrical portion fitting in said bore and having longitudinally extending fuel gas passages therein, the inner ends of which are in communication with said bore in a plane transversely thereof, an oxygen supply conduit within the handle having one end secured to the inner end wall of the torch head and in communication with the interior of the torch head, a seat on the end wall of the torch head within said bore, an axially disposed oxygen passage in the torch tip supporting member having its inner end in communication with said conduit, a tubular compressible sealing element fitted into a bore in the inner end of the tip supporting member and engaged with the seat at the bottom of said bore to prevent leakage of the oxygen into said bore, ducts in the wall of the bore for establishing communication between the fuel gas supply within the handle and the intakes of the fuel gas passages in the tip supporting member, annular compressible sealing elements encircling the cylindrical end portion of the tip supporting member at adjacent sides of the intakes of the fuel gas passages therein for preventing leakage of the fuel gas into the bore, and means for securing the tip supporting member in position within the torch head and whereby the tubular sealing element at the inner end of the tip supporting member may be compressed against the seat at the bottom of the bore, thereby to prevent leakage of the cutting gas into said bore.

6. A torch comprising a handle having means at one end for connecting it to supplies of fuel and cutting gases, a head secured in the opposite end of the handle and having an enlarged bore therein, open at one end, ducts in the cylindrical wall of the bore for establishing communication between the bore and the supply of fuel gas within the handle, a torch tip supporting member having a cylindrical portion fitting in said bore and provided with a plurality of longitudinally extending fuel gas passages having their inner ends in communication with said bore, substantially in alignment with said ducts, said tip supporting member also having an axially disposed cutting gas passage therein, means in the inner end wall of the torch head for connecting the cutting gas passage in the tip supporting member to the supply of cutting gas in the torch handle, a clamping nut received in threaded engagement with the head for securing the tip supporting member in said bore, axially spaced annular grooves in the periphery of the cylindrical end portion of the tip supporting member located at the opposite sides of the plane of said ducts, a compressible annular sealing element in each of said grooves compressed between the bottoms of the grooves and the wall of said bore thereby to prevent leakage of the fuel gas into said bore exteriorly of the sealing elements, and a tubular compressible sealing element mounted in the inner end of the tip supporting member and engageable with an annular seat in the bottom of the bore to prevent leakage of the cutting gas into said bore.

7. A torch comprising a handle having means at one end for connecting it to supplies of fuel gases under pressure, a head secured in the opposite end of the handle and having a cylindrical bore therein, a radial duct in the wall of said bore for establishing communication between the bore and the supply of fuel gas within the handle, a torch tip supporting member having a cylindrical portion slidably fitting in said bore, and a compressible sealing element at each side of the radial duct, said sealing element being interposed between the periphery of the cylindrical end portion of the tip supporting member and the wall of the bore in the torch head and radially compressed therebetween to prevent leakage of the fuel gas from the space between said sealing elements, when the tip supporting member is secured in the torch head.

JOHN E. SMITH.

REFERENCES CITED

The following references are of record in the file of this patent:

UNITED STATES PATENTS

| Number | Name | Date |
|--------|------|------|
| 2,164,972 | Wagner | July 4, 1939 |
| 2,176,813 | Hammon | Oct. 17, 1939 |
| 2,231,199 | Smith | Feb. 11, 1941 |
| 2,258,340 | Smith | Oct. 7, 1941 |